Oct. 25, 1938.　　　P. E. HALL　　　2,134,512
BRAKE
Filed March 21, 1935　　　3 Sheets-Sheet 1

INVENTOR.
PERCY EDGAR HALL
BY
ATTORNEY

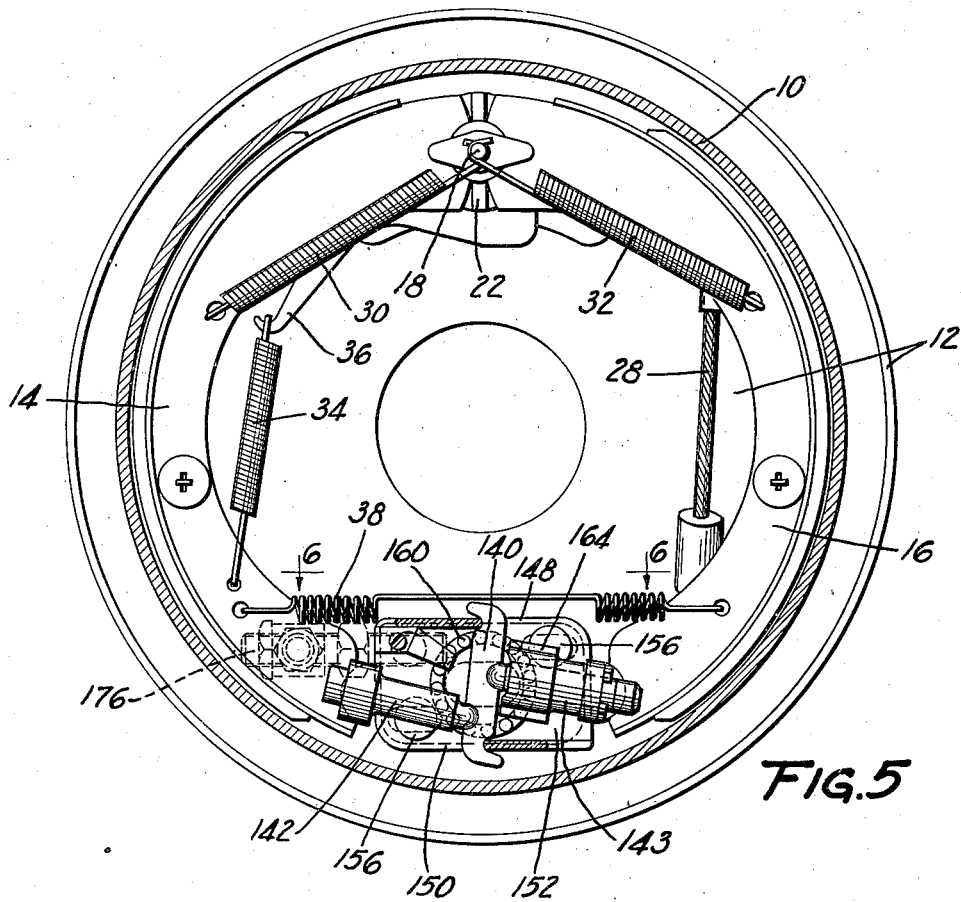
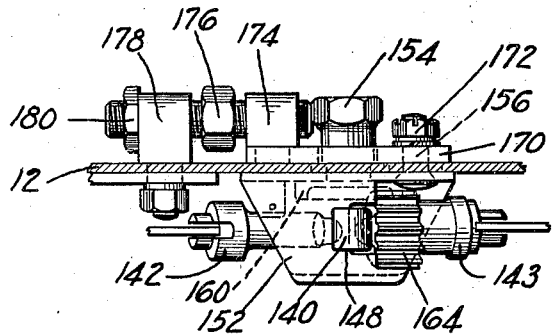

Oct. 25, 1938.　　　P. E. HALL　　　2,134,512
BRAKE
Filed March 21, 1935　　　3 Sheets-Sheet 3

INVENTOR.
PERCY EDGAR HALL
BY
ATTORNEY

Patented Oct. 25, 1938

2,134,512

UNITED STATES PATENT OFFICE 2,134,512

BRAKE

Percy Edgar Hall, Birmingham, England, assignor to Bendix Products Corporation, South Bend, Ind., a corporation of Indiana Application March 21, 1935, Serial No. 12,151
In Great Britain May 24, 1934

20 Claims. (Cl. 188—78)

This invention relates to brakes, and is illustrated as embodied in internal expanding automobile brakes of the shiftable anchorage type.

An object of the invention is to increase the control of the "servo" or multiplying action of one shoe of the brake (or its equivalent) on another, preferably by dividing the thrust of the first or primary shoe in a predetermined manner between the other or secondary shoe and means (preferably carried by the backing plate) serving as an auxiliary anchorage and taking part of the braking torque of the primary shoe.

An important feature of the invention is in the arrangement of the means connecting the shoes or their equivalents to operate as described above in both forward and reverse braking even though the brake anchors on one shoe in forward braking and on the other shoe in reverse braking.

One effective and simple connection achieving the desired method of operation comprises a floating lever fulcruming at one end when one shoe is anchored and at the other end when the other shoe is anchored. This lever is connected, by means such as two thrust links engaging it on opposite sides of its center, with the ends of the two shoes.

Other features of importance relate to the adjustment of the two fulcrums, preferably angularly about an axis approximately at the center of the floating lever, to compensate for wear of the brake shoes, and to the construction and arrangement of several forms of a device provided with the described two fulcrums, and to other novel combinations of parts and desirable particular constructions which will be apparent from the following description of the illustrative embodiments shown in the accompanying drawings, in which:

Figure 1 is a vertical section through the brake, just inside the head of the brake drum, and showing the brake shoes in side elevation;

Figures 2, 3 and 4 are partial sections on the lines 2—2, 3—3, and 4—4 of Figure 1;

Figure 5 is a view similar to Figure 1 but showing an alternative construction;

Figure 6 is a partial section on the line 6—6 of Figure 5;

Figure 1:
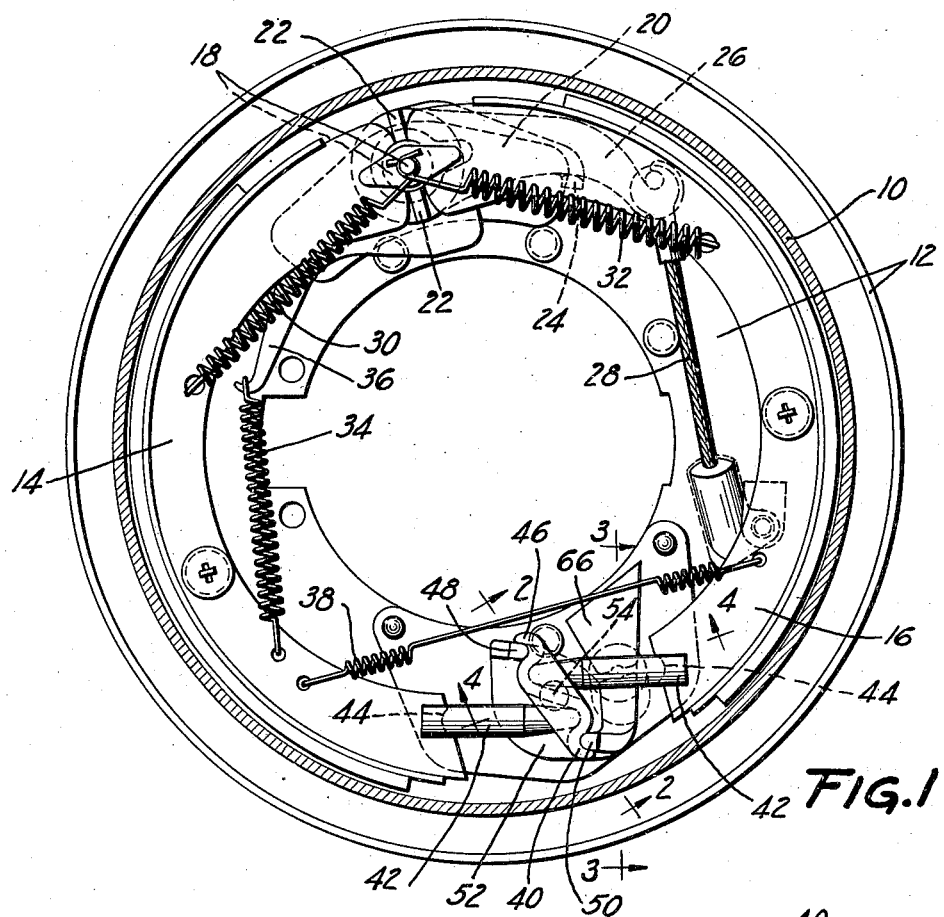

Each of the brakes illustrated comprises a rotatable drum 10 and a stationary backing plate 12, jointly forming a substantially closed space housing friction means herein shown as consisting of two floating shoes 14 and 16. One of the shoes anchors in forward braking, and the other in reverse braking, against a stationary anchor post 18 carried by the backing plate.

The shoes are applied by means such as a floating lever 20, which is cut away to clear the anchor 18, and which has thrust lugs 22 extending between the ends of the webs of the shoes, and which is provided at its end with a lateral lug 24.

The lug 24 is shown operatively engaged by the edge of an operating lever 26 pivoted on the anchor 18 and connected at its end to a cable 28 extending through the backing plate and through a flexible Bowden cable to the operating mechanism on the chassis frame.

While as a matter of convenience of illustration the anchor 18 is shown at the top of the brake and my novel connecting means at the bottom, in most installations the brake is so mounted that the cable 28 is horizontal or substantially so.

The brake of Figure 1 is shown provided with three return springs, viz. a spring 30 tensioned between the anchor 18 and shoe 14 (which is the primary shoe in forward braking), a heavier spring 32 tensioned between the anchor 18 and shoe 16 (secondary shoe in forward braking), and a light spring 34 tensioned between shoe 14 and an extension 36 of lever 20.

This brake is also shown with a spring 38 tensioned between the lower ends of the shoes, and holding under a spring load the novel connection described below.

According to an important feature of the present invention, the lower ends of the shoes are connected by servo-modifying means preferably comprising a floating lever 40 connected to the shoe ends at opposite sides of its center by means such as thrust links 42.

The illustrated lever 40 is a forging formed with sockets receiving the rounded conical ends of links 42. The links 42 are shown slotted at their ends to embrace the ends of the webs of the shoes, the bottoms of the slots being preferably circularly curved to seat pivotally in circularly-shaped notches 44 in the ends of the shoe webs.

The floating lever 40 is preferably formed at its ends, on its opposite sides, with hooks 46 forming sockets having one-way seating engagement with stops or fulcrums 48 and 50 which form, in effect, auxiliary anchors one or the other of which takes that part of the thrust of the primary shoe which is not transmitted as an applying force to the secondary shoe.

The two fulcrums 48 and 50 are, in this particular embodiment of the invention, formed as integral projections extending from a lever 52 lying flat against the backing plate and pivoted to it by a stem 54 extending through it and provided with clamping means such as a nut 56.

The normally-stationary lever 52 is shown as adjustable angularly, preferably from outside the backing plate, to compensate for wear of the brake shoes by shifting the positions of fulcrums 48 and 50. The means illustrated in Figures 1, 2, and 3 for this purpose include a stem 60 threaded through a fitting 62 secured to the backing plate, and having at its end a conical head 64 wedgingly engaging between the edge of lever 52 and a stationary abutment 66 secured to the backing plate.

To yieldingly lock the adjustment, the head 64 may be formed with grooves adapted to receive a pawl such as a spring-pressed ball 68, shown mounted in the abutment 66.

Since the fitting 62 must shift slightly with the adjustment, it is shown attached to the backing plate by being pivotally mounted on the stem 54.

Figures 2, 3, 4:
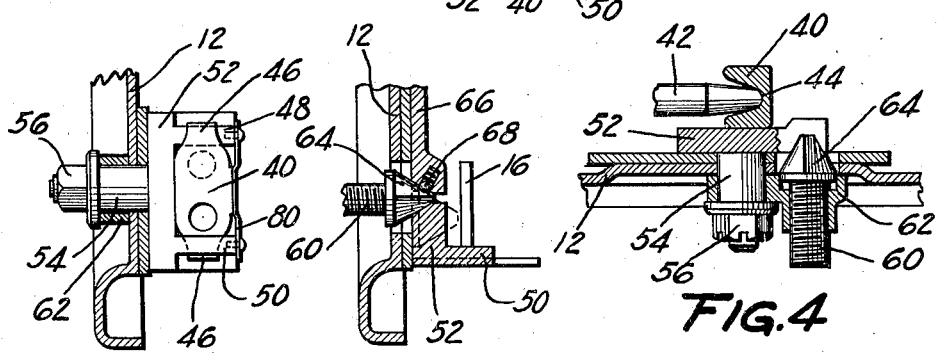

As shown in Figure 2, the fulcrums 48 and 50 may carry a plate 80 confining the lever 40 laterally.

In operation, when the brake is applied with the drum turning counter-clockwise in Figure 1 (forward braking), shoe 14 thrusts against the floating lever 40, which pivots on the lower fulcrum 50 and transmits a part (preferably about one-half) of its braking torque to the fulcrum and the remainder to the secondary shoe 16 as an applying force. Shoe 16 anchors on the main anchor 18.

In reverse braking, shoe 16 rocks lever 40 on fulcrum 48 to apply shoe 14.

In the embodiment of Figures 5 and 6, lever 140 corresponds to the lever 40, and is connected to the shoes by thrust links 142 and 143, at least the latter of which is formed of two parts which are threaded together so that it can be adjusted as to its length.

The upper and lower ends of the lever 140 ride in slots 148 and 150 in the walls of a stamped housing 152, the ends of the two slots forming fulcrums corresponding to fulcrums 48 and 50.

The housing 152 is provided with an angularly-adjustable stem 154 extending through the backing plate and having formed thereon or secured thereto a crown gear 160 meshing with and driving a pinion 164 which is shown integral with one of the threaded-together parts of link 143.

The housing 152 may be adjusted on the backing plate, which has a slot for the stem 154 so that this adjustment will not be interfered with. The housing has two threaded stems 156 passing through slots in the backing plate and through openings in a clamp plate 170, and provided with clamp nuts 172 for locking the housing to the backing plate.

The plate 170 has a threaded lug 174 receiving one end of a right-and-left threaded turnbuckle adjuster 176, the other end of which is received in a threaded lug 178 secured fixedly to the backing plate. A lock-nut 180 is shown on the adjuster 176 to lock the adjustment in any desired position.

Figure 7:
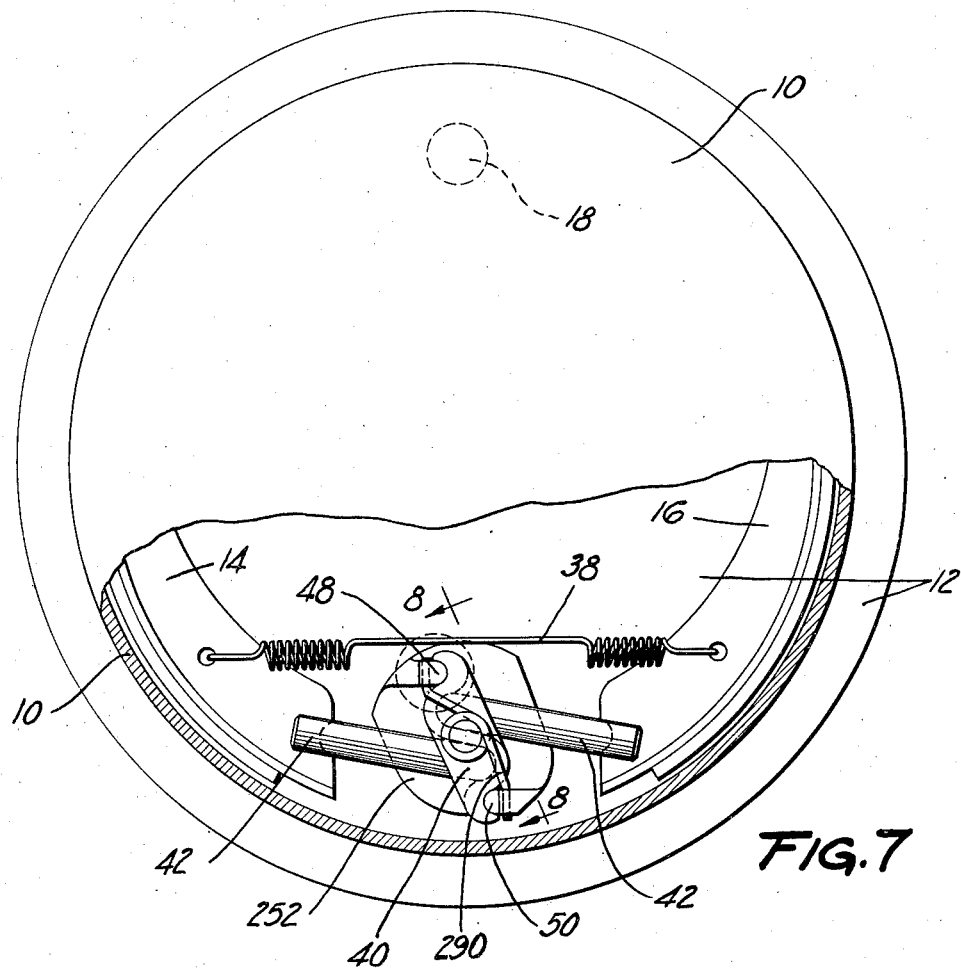
Figure 7 is an elevation broken away in vertical section at the bottom and showing a third form of brake.
Figure 8:
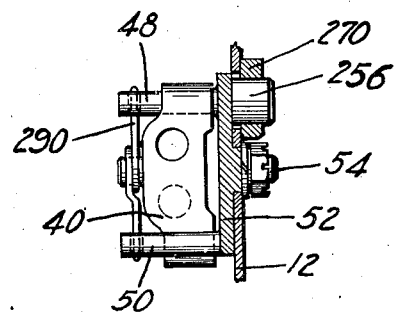
Figure 8 is a partial section on the line 8—8 of Figure 7.

In the embodiment of Figures 7 and 8, the fulcrums 48 and 50 and the lever 52 carrying them are shown integral with a stem 256 extending through a somewhat larger opening in the backing plate and thence into an opening in a plate 270 provided with a turnbuckle adjuster as above described for the plate 170, or with any suitable equivalent means acting on the stem 256 to rock the lever 52 about its stem 54.

In Figures 7 and 8, there is shown a spring 290 encircling a lug on lever 40 and with its ends yieldingly bearing against the fulcrums 48 and 50, and which therefore urges the lever back against those fulcrums when the brake is released.

While three illustrative embodiments have been described in detail, it is not my intention to limit the scope of my invention to those particular embodiments or otherwise than by the terms of the appended claims.

I claim:

1. A brake comprising, in combination with a drum, friction means having an anchorage at one side of the brake to which braking torque is transmitted by one end of the friction means when the drum is turning in one direction and by the other end thereof when the drum is turning in the other direction, and means at the other side of the brake taking a portion of the braking torque only in both directions of drum rotation, said means comprising a lever having two fulcrums spaced radially of the brake and upon one of which the lever fulcrums when the drum is turning in one direction and upon the other of which the lever fulcrums when the drum is turning in the other direction.

2. A brake comprising, in combination with a drum, shoes having an anchorage at one side of the brake to which braking torque is transmitted by one shoe when the drum is turning in one direction and by the other shoe when the drum is turning in the other direction, means connecting the shoes at the other side of the brake, and auxiliary anchorage means comprising a lever having alternative fulcrums to one or the other of which it transmits a portion only of the braking torque of whichever is the unanchored shoe in both directions of drum rotation.

3. A brake comprising, in combination with a drum, shoes having an anchorage at one side of the brake to which braking torque is transmitted by one shoe when the drum is turning in one direction and by the other shoe when the drum is turning in the other direction, means connecting the shoes at the other side of the brake, and auxiliary anchorage means comprising a lever having two alternative fulcrums spaced apart radially of the drum and to one or the other of which it transmits a portion of the braking torque only of whichever is the unanchored shoe in both directions of drum rotation, said auxiliary anchorage means being operatively engaged by the connecting means.

4. A brake comprising friction means with applying and anchorage means associated therewith, in combination with a device comprising a floating lever connected between two parts of the friction means and having two fulcrums spaced apart radially of the brake and alternatively engaged thereby when the brake is applied, whereby the thrust of one of said parts is in both forward and reverse braking divided between the other of said parts and one of said fulcrums.

5. A brake comprising friction means with applying and anchorage means associated therewith, in combination with a device comprising a floating lever connected between its center and each of its ends respectively to two parts of the friction means and having two fulcrums alternatively engaged by its ends when the brake is applied, whereby the thrust of one of said parts is in both forward and reverse braking divided between the other of said parts and one of said fulcrums.

6. A brake comprising friction means with applying and anchorage means associated therewith, in combination with a device comprising a floating lever connected between two parts of the friction means and having two fulcrums spaced apart radially of the brake and alternatively engaged thereby when the brake is applied, whereby the thrust of one of said parts is in both forward and reverse braking divided between the other of said parts and one of said fulcrums, and having means for adjusting the positions of said fulcrums to compensate for wear of the friction means.

7. A brake comprising friction means with applying and anchorage means associated therewith, in combination with a device comprising a floating lever connected between its center and each of its ends respectively to two parts of the friction means and having two fulcrums alternatively engaged by its ends when the brake is applied, whereby the thrust of one of said parts is in both forward and reverse braking divided between the other of said parts and one of said fulcrums, and having means for adjusting the positions of said fulcrums to compensate for wear of the friction means.

8. A brake comprising a pair of shoes, anchorage and applying means between one pair of adjacent shoe ends, a lever between the other pair of adjacent shoe ends, connections from the lever to the shoe ends, and a stop adjacent each end of the lever limiting its movement in one direction without restricting its movement in the other direction.

9. A brake comprising a pair of shoes, a lever between the ends of the shoes, connections from the lever to the shoe ends, a stop adjacent each end of the lever limiting its movement in one direction without restricting its movement in the other direction, and means for shifting the positions of said stops to adjust the brake for wear.

10. A brake comprising a pair of shoes, a lever between the ends of the shoes, connections from the lever to the shoe ends, a stop adjacent each end of the lever limiting its movement in one direction without restricting its movement in the other direction, and means for shifting the positions of said stops angularly about a center at the said point of said lever to adjust the brake for wear.

11. A brake-shoe connecting device comprising a lever operatively connected to the shoe ends and provided at each end with a stop serving as a fulcrum limiting the movement of the lever in one direction only.

12. A device adapted to be mounted on a brake backing plate for cooperation with friction means carried thereby, comprising a lever adapted to be pivoted on the inner face of said plate and having spaced fulcrum lugs, means operable from outside the plate for shifting and fixing the angular position of the lever, and a floating lever engaged on opposite sides at its ends by said lugs.

13. A device adapted to be mounted on a brake backing plate for cooperation with the adjacent ends of shoes carried thereby, comprising a lever adapted to be pivoted on the inner face of said plate and having spaced fulcrum lugs, means operable from outside the plate for shifting and fixing the angular position of the lever, a floating lever engaged on opposite sides at its ends by said lugs, and connections to the ends of said shoes respectively from parts of the floating lever between said lugs and the center of the floating lever.

14. A device adapted to be mounted on a brake backing plate for cooperation with friction means carried thereby, comprising a lever adapted to be pivoted on the inner face of said plate and having spaced fulcrum lugs, and a floating lever engaged on opposite sides at its ends by said lugs.

15. A device adapted to be mounted on a brake backing plate for cooperation with the adjacent ends of shoes carried thereby, comprising a lever adapted to be pivoted on the inner face of said plate and having spaced fulcrum lugs, a floating lever engaged on opposite sides at its ends by said lugs and connections to the ends of said shoes respectively from parts of the floating lever between said lugs and the center of the floating lever.

16. A device adapted to be mounted on a brake backing plate for cooperation with the adjacent ends of shoes carried thereby, comprising a lever adapted to be pivoted on the inner face of said plate and having spaced fulcrum lugs, a member threaded through the plate and wedgingly engaging the lever for shifting and fixing the angular position of the lever, a floating lever engaged on opposite sides at its ends by said lugs, and connections to the ends of said shoes respectively from parts of the floating lever between said lugs and the center of the floating lever.

17. A device adapted to be mounted on a brake backing plate for cooperation with the adjacent ends of shoes carried thereby, comprising a lever adapted to be pivoted on the inner face of said plate and having spaced fulcrum lugs, a floating lever engaged on opposite sides at its ends by said lugs, and connections to the ends of said shoes respectively from parts of the floating lever between said lugs and the center of the floating lever, at least one of said connections being adjustable as to length.

18. A device comprising a hollow housing having slots in its opposite sides, a floating lever having its ends in said slots and with each of said ends limited as to movement in one direction by the end of its slot but substantially unrestricted as to movement in the slot in the opposite direction, and shoe connections engaging opposite sides of said lever on opposite sides of its center of length.

19. A device comprising a hollow pivoted housing having slots in its opposite sides, a floating lever having its ends in said slots and with each of said ends limited as to movement in one direction by the end of its slot but substantially unrestricted as to movement in the slot in the opposite direction, shoe connections engaging opposite sides of said lever on opposite sides of its center of length, and means movable about the axis of the pivot of the housing for adjusting at least one of said connections as to length.

20. A device comprising a part having a body portion with fulcrum lugs projecting on one side at its ends, and having a central threaded stem and an end lug projecting on its opposite side.

P. E. HALL.